US008310699B2

(12) United States Patent
Mulligan et al.

(10) Patent No.: US 8,310,699 B2
(45) Date of Patent: Nov. 13, 2012

(54) SYSTEM AND METHOD FOR MEASURING A FAX CONVERTED INTO ELECTRONIC FORMAT

(75) Inventors: Tom Mulligan, Knocknacarra (IE); Nicola Fawle, Kilcolgan (IE)

(73) Assignee: J2 Global Ireland Limited, Dublin (IE)

( * ) Notice: Subject to any disclaimer, the term of this patent is extended or adjusted under 35 U.S.C. 154(b) by 1198 days.

(21) Appl. No.: 12/114,686

(22) Filed: May 2, 2008

(65) Prior Publication Data
US 2009/0034015 A1 Feb. 5, 2009

(30) Foreign Application Priority Data
May 2, 2007 (GB) .................................. 0708504.6

(51) Int. Cl.
H04N 1/00 (2006.01)
(52) U.S. Cl. .................... 358/1.15; 358/400; 358/406
(58) Field of Classification Search .................. 358/1.1, 358/1.13, 1.15, 400, 401, 402, 407, 408, 358/440, 468, 406
See application file for complete search history.

(56) References Cited

U.S. PATENT DOCUMENTS

| 5,251,044 | A | 10/1993 | Ikegaya |
| 5,490,199 | A | 2/1996 | Fuller et al. |
| 6,625,642 | B1 | 9/2003 | Naylor et al. |
| 6,650,440 | B1 | 11/2003 | Wing |
| 6,882,438 | B1* | 4/2005 | Kanaya .................... 358/1.15 |
| 6,892,239 | B1 | 5/2005 | Kirkeby |
| 2001/0017700 | A1 | 8/2001 | Homma |
| 2003/0208688 | A1 | 11/2003 | Bobo, II |
| 2004/0010757 | A1 | 1/2004 | McCoy et al. |
| 2004/0046972 | A1 | 3/2004 | Shibao |
| 2004/0085569 | A1 | 5/2004 | Fukuhara |
| 2004/0100642 | A1 | 5/2004 | Nozato |
| 2005/0231758 | A1* | 10/2005 | Reynolds .................... 358/1.15 |
| 2006/0250631 | A1* | 11/2006 | Igarashi .................... 358/1.13 |
| 2006/0294031 | A1 | 12/2006 | Muller et al. |

FOREIGN PATENT DOCUMENTS

| GB | 2321573 A | 7/1998 |
| WO | WO-0110113 A2 | 2/2001 |
| WO | WO-03100575 A2 | 12/2003 |

(Continued)

OTHER PUBLICATIONS

PCT International Search Report (dated Jan. 28, 2009), International Application No. PCT/IB2008/001785, International Filing Date—Feb. 5, 2008, (12 pages).
UK Search Report (under Section 17), dated Aug. 21, 2007, Application No. GB0708504.6, (1 page).

(Continued)

*Primary Examiner* — Thomas D Lee
(74) *Attorney, Agent, or Firm* — Blakely, Sokoloff, Taylor & Zafman, LLP

(57) ABSTRACT

A fax conversion system for determining a measure of the number of pages transmitted by fax to or from a plurality of users, comprising: means for converting the transmitted pages into a format that can be output electronically rather than in hardcopy, means for counting the number of pages within an individual fax transmission, means for associating said fax transmission with a respective one of said plurality of users, and means for determining a measure of the total number of pages transmitted by fax to or from each of said plurality of users. The system may determine a measure of an equivalent number of trees saved, or the number of carbon credits gained, by not producing hardcopies of transmitted pages.

18 Claims, 4 Drawing Sheets

FOREIGN PATENT DOCUMENTS

WO  WO-2005070065 A2  8/2005

OTHER PUBLICATIONS

WireFast—The Wirefast Platform, Jan. 8, 2007, Internet download at: http://www.wirefast.com, (1 page).

GreenFax.com, Internet Faxing/Virtual Fax, Jan. 22, 2007, Internet download at: http://www.greenfax.com, (1 page).

"Advanced Metering", Carbon Trust, Advanced Metering/Carbon Trust, Jan. 23, 2007, Internet download at: http://www.carbontrust.co.uk/technology/technologyaccelerator/advanced_metering.htm?print=1, (1 page).

"C•O•M•O•D•O Enterprise SSL", Fax Free Internet Fax Service efax Fax to Email Fax Online, Feb. 2, 2007, Internet download at: http://www.enterprisessl.com/ssl-certificate-products/fax-free.html, (4 pages).

"Mediaburst Inspiring Communication", Fax via Email, Jan. 23, 2007, Internet download at: http://www.mediaburst.co.uk/fax-via-email.htm, (3 page).

\* cited by examiner

SYSTEM AND METHOD FOR MEASURING A FAX CONVERTED INTO ELECTRONIC FORMAT

The present patent application claims priority to United Kingdom Application No. GB0708504.6, filed 2 May 2007.

FIELD OF THE INVENTION

The present invention relates to a system for and method of determining the number of pages transmitted to or from a plurality of users. In particular, the invention relates to monitoring fax transmissions to and from a user, determining the number of pages within each fax transmission and associating each fax transmission with a user, or a group of users.

BACKGROUND OF THE INVENTION

Facsimile (fax) devices are popular mechanisms for the transmission of text and graphics. They are relatively easy to use and inexpensive to purchase, and transmission by fax machine is fast and cost effective. In addition, fax machines can transmit over ordinary telephone lines without the need for any special service.

Fax messaging continues to be an important avenue for easy delivery of messages between individuals worldwide. Fax messaging continues to be important despite the proliferation of data services that use the Internet because it provides an avenue for transmitting a tangible document without transcription, copying, etc. However, it is not always necessary for a recipient of a fax communication to have a tangible document. Indeed, it is beneficial both from a fiscal and from an environmental perspective to minimize the amount of physical resources consumed when the recipient views the fax.

SUMMARY OF THE INVENTION

According to a first aspect of the present invention there is provided a system for determining a measure of the number of pages transmitted by fax to or from a plurality of users, comprising: means (preferably in the form of a processor and associated memory) for converting the transmitted pages into a format that can be output electronically rather than in hardcopy, means (preferably in the form of a processor and associated memory) for counting the number of pages within an individual fax transmission, means (preferably in the form of a processor and associated memory) for associating said fax transmission with a respective one of said plurality of users, and means (preferably in the form of a processor and associated memory) for determining a measure of the total number of pages transmitted by fax to or from each of said plurality of users.

According to a further aspect of the present invention there is provided a system for determining a measure of the number of pages transmitted to or from a plurality of users, comprising: means (preferably in the form of a processor and associated memory) for counting the number of pages within an individual transmission, means (preferably in the form of a processor and associated memory) for associating said transmission with a respective one of said plurality of users, and means (preferably in the form of a processor and associated memory) for determining a measure of the total number of pages transmitted to or from each of said plurality of users. This may improve efficiency in transmitting documents with pages.

Preferably, the system allocates at least one such measure, associated with one of said plurality of users, to a group.

Preferably, the system allocates a plurality of measures, associated with respective ones of said plurality of users, to said group.

Preferably, the system allocates a respective one such measure to each of a plurality of said groups.

Preferably, the system further comprises means for determining, as a group measure, a total of the measures allocated to a given group.

Preferably, the system further comprises means (preferably in the form of a processor and associated memory) for determining a total of the measures that are not allocated to any group.

Preferably, the system further comprises means (preferably in the form of a processor and associated memory) for determining a total of all the measures.

Preferably, the system further comprises a user interface. The user interface may be adapted to output any desired total or sub-total number of pages transmitted. The user interface may be further adapted to output said measure of the total number of pages transmitted to or from a given user. The user interface may be yet further adapted to output a given group measure.

Preferably, the user interface includes a display device to display the output of said user interface.

Preferably, the user interface accesses via the internet the information to be output.

Preferably, the transmission is a fax.

Preferably, a plurality of fax numbers are associated with a single user, so that tracking of fax usage is accomplished more efficiently.

Preferably, the means for counting the number of pages is adapted to use information stored within the fax file header, so that the number of pages within the transmissions is counted more accurately.

Preferably the system further comprises means (preferably in the form of a processor and associated memory) for associating a plurality of fax numbers with a single user, so that for example user sub-accounts may be created.

Preferably, the system further comprises means (preferably in the form of a processor and associated memory) for analysing said measure, and said analysis is adapted to determine a measure of the equivalent number of trees saved by not producing hardcopy faxes. The measure analysed may be a single measure of a single user, a measure of a group of users, or a measure of all of the measures. By calculating the equivalent number of trees saved by not producing hardcopy faxes the system may provide users with a clear understanding of the effects on the environment.

Preferably, said analysis includes determining a measure of the number of carbon credits gained by the or each said user based on said number of trees saved. By calculating the number of carbon credits gained by the or each said user $CO_2$ emissions may be reduced.

According to a further aspect of the invention there is provided a system for monitoring fax transmissions to and from a user, comprising means (preferably in the form of a fax machine) for receiving said fax, means (preferably in the form of a processor and associated memory) for converting said fax into an electronic format, means (preferably in the form of a processor and associated memory) for monitoring the total number of faxes converted for said user, and means (preferably in the form of a processor and associated memory) for determining a measure of the total number of pages within said faxes. Thus fax transmissions may be monitored more efficiently.

Preferably, the fax file format is Tagged-Image-File-Format (TIFF).

Preferably, the system further comprises means (preferably in the form of a processor and associated memory) for converting a transmitted page into a format that can be output electronically rather than in hardcopy.

Preferably, the system further comprises means (preferably in the form of a processor and associated memory) for analysing said measure, wherein said analysis is adapted to determine a measure of an equivalent number of trees saved by not producing hardcopies of transmitted pages.

Preferably, the system further comprises means (preferably in the form of a processor and associated memory) for analysing said measure, wherein said analysis is adapted to determine a measure of a number of carbon credits gained by not producing hardcopies of transmitted pages. The analysing means may be adapted to determine said measure for any desired total or sub-total of pages transmitted.

Preferably, the pages within a fax converted from fax protocol to another electronic format are counted. By counting and keeping track of the number of pages converted for each individual user a more efficient use of paper resources may be made.

Preferably, the more efficient use of paper resources leads to a reduction in energy consumption, and a greater carbon sequestration by trees not cut down for paper production. Preferably, the present invention affords the ability to store, for each individual user, the total number of pages equivalent to A4 size converted into another electronic format. Preferably, the system affords the ability to calculate the equivalent number of trees not cut down as a result of the conversion from hardcopy to softcopy; preferably this calculation utilizes for example internationally recognized standards. Preferably, the number of carbon credits gained by not cutting down the trees is calculated; preferably this calculation utilizes for example internationally recognized standards.

According to a yet further aspect of the present invention there is provided a system for allocating carbon credits, comprising: means (preferably in the form of a processor and associated memory) for counting the number of fax pages converted into softcopy for a user, means (preferably in the form of a processor and associated memory) for calculating the resulting number of trees saved, and means (preferably in the form of a processor and associated memory) for calculating the number of carbon credits associated with said number of trees saved for said user. Thus companies could earn carbon credits more efficiently.

According to a yet further aspect of the present invention there is provided a system for improving carbon sequestration, comprising means (preferably in the form of a processor and associated memory) for counting the number of fax pages converted into softcopy for a user, and means (preferably in the form of a processor and associated memory) for calculating the resulting number of trees saved, wherein the saved trees increase carbon sequestration.

According to a yet further aspect of the present invention there is provided a method of determining a measure of the number of pages transmitted to or from a plurality of users, comprising: counting the number of pages within an individual transmission, associating said transmission with a respective one of said plurality of users, and determining a measure of the total number of pages transmitted to or from each of said plurality of users.

According to a yet further aspect of the present invention there is provided, a method of determining a measure of the number of pages transmitted by fax to or from a user, comprising: counting the number of pages within an individual fax transmission, associating said fax transmission with a user, and determining a measure of the total number of pages transmitted by fax to said user.

According to a yet further aspect of the present invention there is provided a system for sending faxes via email, comprising: means (preferably in the form of a processor and associated memory) for recognising the email domain name, means (preferably in the form of a processor and associated memory) for associating said domain name with a main user, and means (preferably in the form of a processor and associated memory) for converting said email into a fax and transmitting it to the intended recipient. Thus the process of sending faxes via email may be accomplished more efficiently.

Preferably, the system further comprises means (preferably in the form of a processor and associated memory) for verifying the identity of a sub-user.

Preferably, the verifying means (preferably in the form of a processor and associated memory) is adapted to recognise the IP address of said sub-user's computer, and said IP address is used to confirm the identity of the email sender in conjunction with said domain name.

Preferably, the verifying means (preferably in the form of a processor and associated memory) is adapted to recognise the Domain Name Server of the sub-user's email, and said Domain Name Server is used to confirm the identity of the email sender in conjunction with said domain name.

According to a yet further aspect of the present invention there is provided a computer when programmed to carry out the methods as described herein.

Further features of the invention are characterised by the appended claims. The invention extends to methods and/or systems substantially as herein described with reference to the accompanying drawings.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

System or apparatus and method features may be interchanged as appropriate, and may be provided independently one of another. Any feature in one aspect of the invention may be applied to other aspects of the invention, in any appropriate combination. In particular, method aspects may be applied to system or apparatus aspects, and vice versa.

As used herein, the term "user" connotes not only an individual person, but also a number of such people or for example a legal person, such as a company.

BRIEF DESCRIPTION OF THE DRAWINGS

Preferred features of the present invention will now be described, purely by way of example, with reference to the accompanying figures, in which:—

DETAILED DESCRIPTION

A system is provided for monitoring, recording and analysing fax conversion from a standard fax protocol (such as ITU-T T.30, ITU-T T.38 or Group 3) to another protocol (format) such as TIFF, or PDF (or Microsoft word document). Although the faxes are still transmitted using a standard protocol upon receipt they are then converted into the required format.

Figure 1:
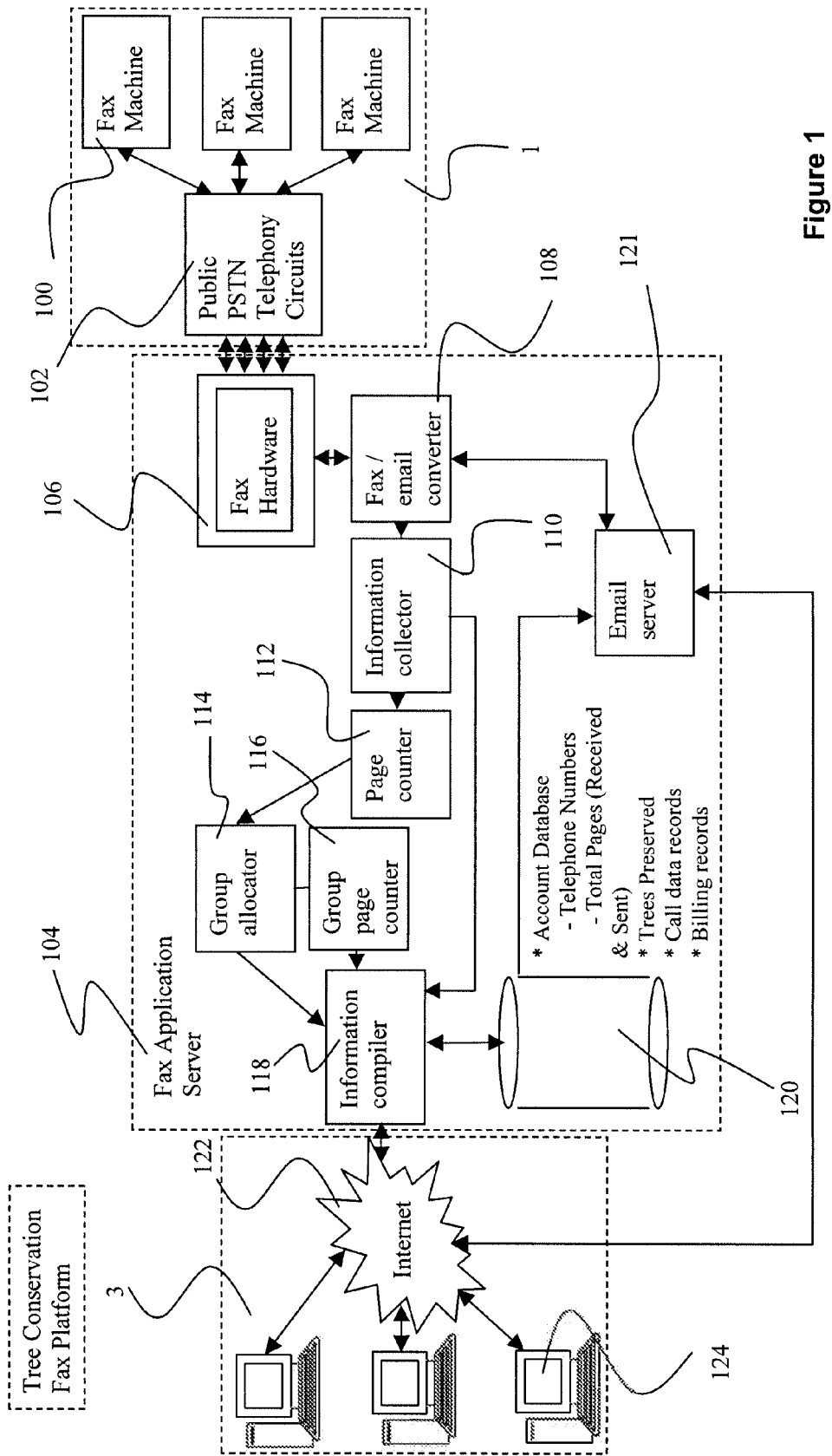
FIG. 1 is a schematic diagram of the overall system.

In overview, as shown in FIG. 1, there are three main elements. The first element comprises a fax machine 100 in communication with a Public Switched Telephone Network (PSTN) 102. The second element 104 provides the means by which the incoming faxes are converted, processed and sent on to users, and comprises a fax application server 104 containing fax hardware 106, a fax to email converter 108, an information collector 110, a page counter 112, a group allocator 114, a group page counter 116, an information compiler 118, and a database within the central server 120. In addition there is an email server 121 from which the converted faxes are communicated to the users. The third element comprises the internet 122, and user interfaces accessible via computers 124. Although the incoming and outgoing fax transmissions are shown as using a PSTN it should be noted that the faxes may be sent/received via IP (so called Fax over Internet Protocol (FoIP)). Therefore, as used herein the term PSTN should be considered as interchangeable with IP within this description.

In more detail, the first element comprises the means for incoming faxes to be communicated to the fax application server 104. The fax application server has standard PSTN circuits connected to it via E1/T1 lines. These are used for receipt and transmission of fax messages over standard telephone lines. The fax application server 104 can receive incoming faxes from any conventional fax machine 100 via the PSTN 102. The incoming faxes can be addressed to any one of a number of users of the system. Each user may have multiple fax numbers associated with their user account, and indeed multiple users may associate their incoming faxes with a single account.

The second element 104 includes the fax hardware 106 which receives the incoming fax message from the PSTN 102. The fax message is then passed to the fax to email converter 108 which converts the fax into an electronic format capable of being displayed by a computer, such as a PDF or TIFF (or MS word document). Information is collected from the fax message by the information collector 110. Information such as the time of the message, the fax number that the message was sent from, and an identifier are collected. The page counter 112 then counts the number of pages within the fax message and passes the information through the group allocator 114. The group allocator 114 allocates the message to a group. The group may contain one or more fax numbers, and one or more users. Therefore, it is possible for a user to be associated with a single fax number, or for a user to be associated with multiple fax numbers, or for many users to be associated with a single group, or any combination thereof. The group page counter 116 provides a further measure of the number of pages within the faxes sent to the group.

The information compiler 118 then compiles the information collected and stores the information in the database within the central server 120. The fax is then sent to the user via the email server 121. The email server is in communication with the fax to email converter 108, and the central server 120. The fax to email converter provides the electronic version of the fax and the central server provides the email address to send the email to. The fax is then emailed to the pre-defined email address of the user.

In summary the fax application server 104 contains the means for:
- receiving fax documents via telephony or IP
- sending fax documents via telephony or IP
- keeping a record of how many A4 (or letter size) pages are associated with each fax
- keeping a record of fax pages associated with each account
- management of historical information associated with faxes e.g. each telephone call, date received, which telephone numbers etc
- production of charges associated with receipt and sending of faxes
- algorithms for calculating tree preservation count
- registration of new accounts and fax identity association
- standard fax PCI hardware for receipt and transmission of faxes e.g. brooktrout, aculab PCI cards etc
- customer invoice creation
- transmission of faxes via email The central server 104 incorporates a database for storing information relating to the users of the platform. The database contains, for each user, a record of the telephone number(s) associated with the user's incoming faxes; thus the system is enabled to receive incoming faxes and forward them via IP to the user. The system maintains a record within the database of the number of faxes the user has received electronically. The faxes converted into an alternative electronic format are equated to equivalent A4, A3, B4, letter or any other standard page sizes, and the number of such pages is recorded.

In summary, the database (within the central server) contains all information associated with the system. Typical information stored within it would be:
- Customer account details—contacts, passwords, email addresses, fax telephone number(s) etc
- Call data records (CDR)— history of all inbound and outbound fax telephony and internet calls
- History of the number of pages associated with all faxes received and sent for each customer
- Number of trees preserved per customer
- Carbon credits accumulated per customer In addition, the system is adapted to receive outgoing faxes from a user allowing the user to send a fax to an external party without converting the document to be faxed into a hard copy first. The system records in the central server 104 the total number of A4 pages, or any other paper size equivalent that is applicable, that are sent by the user not requiring a hard copy.

The third main element, 3, shown in FIG. 1 comprises the internet 122, and the user interface 124. The internet 122 is used both to transmit the emails to the user and for the user to access the information in the central server 120 via the user interface 124. The user interface allows the user to access the information stored within the system. In addition, the user may also set up the email addresses that the converted faxes should be sent to, request additional fax numbers to be associated with the user, and other such maintenance features.

The user interface 124 is in the form of a web interface that allows the user to securely log on, providing the user with the ability to view the number of pages (i.e. received and sent in softcopy format) converted from hardcopy fax protocol to softcopy. This information is shown broken down into the individual fax numbers associated with the user, and into outgoing and incoming faxes. Furthermore, the user is also presented with information relating to the number of trees that the converted pages equates to, and the number of carbon credits that they have been awarded as a direct consequence of the saved trees.

Figure 2:
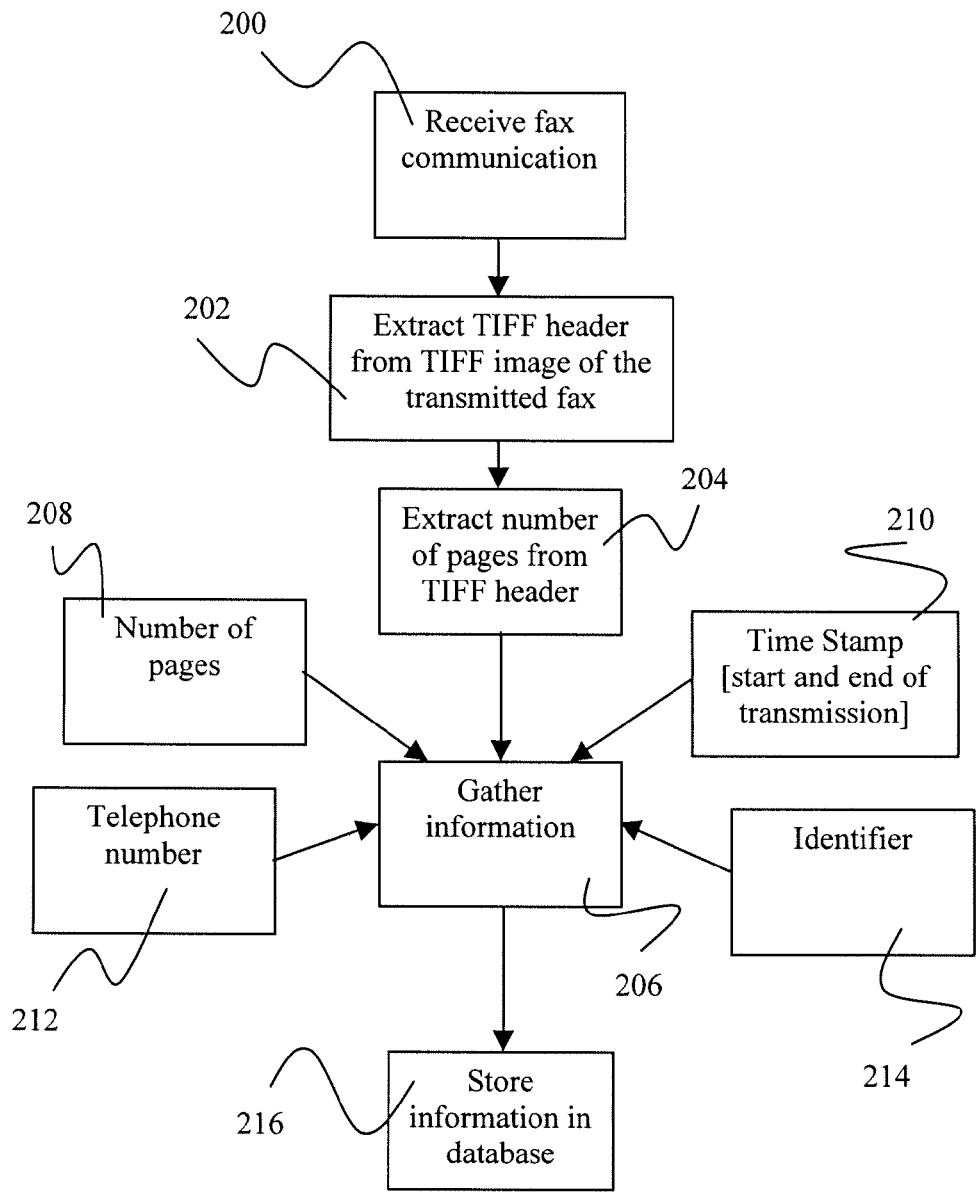
FIG. 2 is a flow diagram of the page tracking system.

FIG. 2 is a flow diagram of the process used to obtain the number of pages transmitted within the fax. The system receives the communication, step 200, either from the user with an outgoing fax, or from an external party with an incoming fax. The content of the fax is in the form of a TIFF image. The system extracts from the TIFF file the TIFF header, step 202, which contains, among other information, the number of pages contained within the file. The next step is to extract the number of pages from the TIFF file header, step 204. The system then proceeds to collect the other relevant information to that specific fax, step 206. The information collected includes: the number of pages 208; a time stamp indicating the time the transmission started and ended 210; the telephone number the fax was sent from or to 212; and an identifier 214, which would allow each fax to be associated with a particular user. For example, the identifier may be one of the incoming or the outgoing fax number. Finally, the collected information 206 is stored in the database, step 216.

The number of pages sent can in this way be stored in the database and associated with a user. The identifier used allows the faxes received to any number of telephone numbers to be associated with a single user. This allows a company to have multiple fax numbers but have a single user account, and therefore store all of the information relating to all of the fax numbers in a single location. In a further example, a large multinational company may have hundreds of fax numbers for their many national subsidiaries but wish to store the information pertaining to the number of fax pages not sent in hardcopy format in a single location, and thereby allow a more efficient handling of their fax monitoring system.

Figure 3:
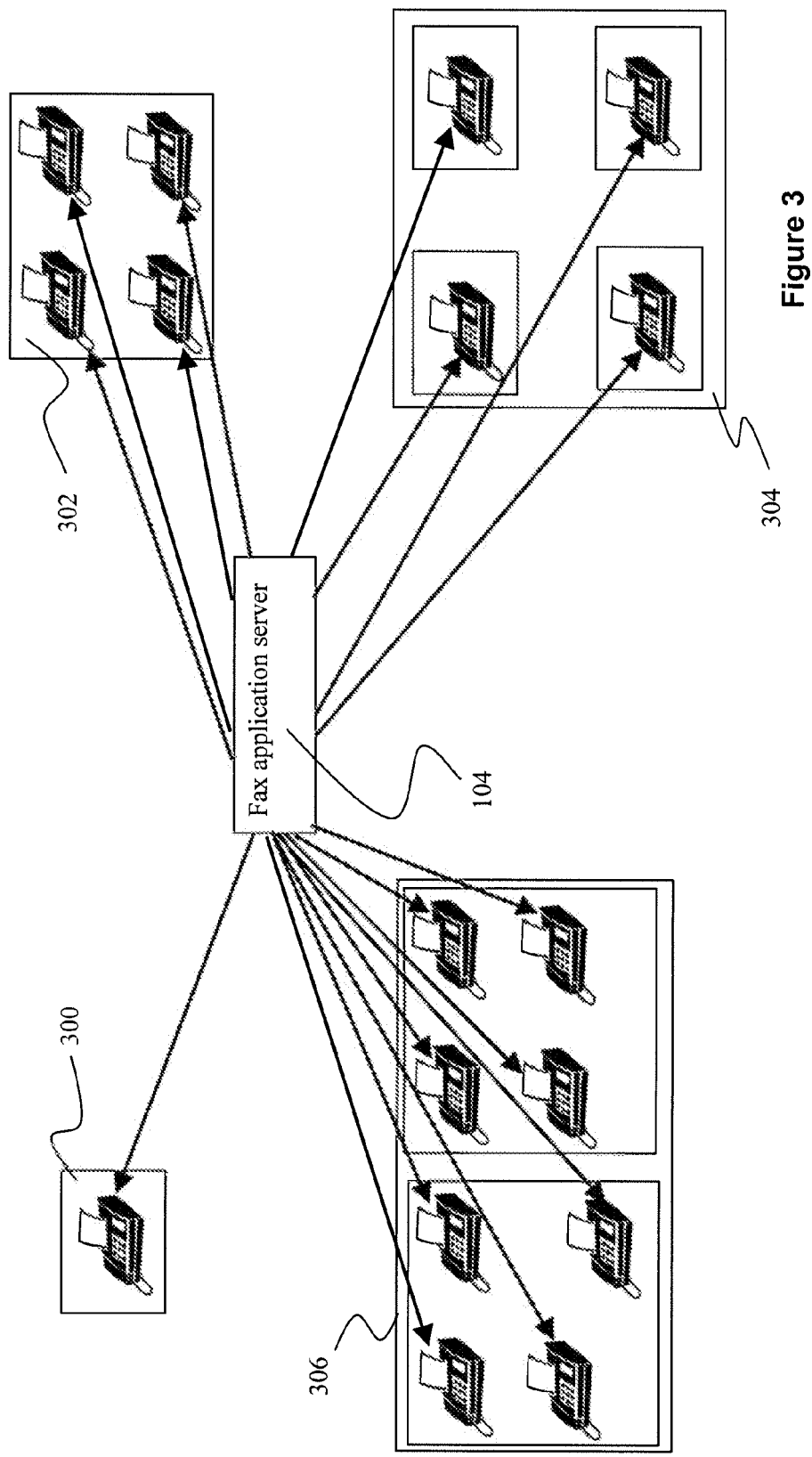
FIG. 3 is a schematic diagram of the combinations of user types.

The present invention may provide a single platform capable of receiving and sending faxes for a plurality of users. FIG. 3 shows an overview of the variety of user types that the system can handle. Each user is able to have one, 300, or more, 302, fax numbers associated with their account. The single fax application server 104 is therefore highly adaptable and capable of handling large numbers of users. In addition, the system allows for multiple users to group together to contribute to a single total of pages converted from hardcopy to softcopy within faxes, 304. Furthermore, multiple groups of users with multiple fax numbers can combine their converted pages total to produce a single total, as in group 306. When combined with the possibility of multiple fax application servers, it can be seen that there are a very large number of combinations available to the user. In each case a single total of pages converted from fax protocol to another electronic protocol is produced for each group.

A group may contain one user or multiple users. Grand totals may be produced for two or more groups in combination, and equally sub-totals may be produced for groups or sub-groups.

Email to Fax Conversion

Figure 4:
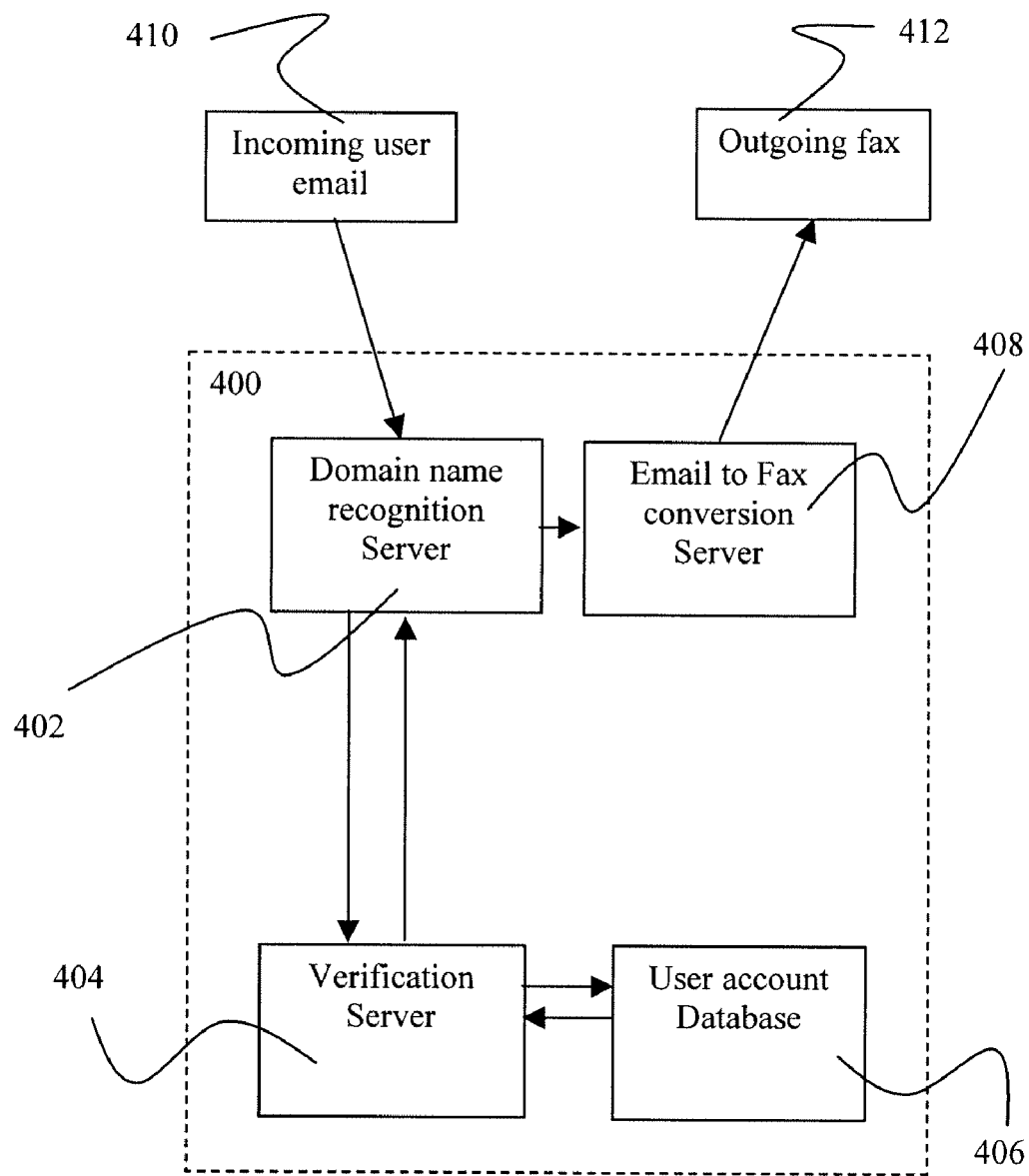
FIG. 4 is a schematic diagram of the domain name recognition system.

A system is provided that enables email communications to be converted into fax protocol and transmitted to another party. The system enables the user to create a single (for example master) account capable of allowing a number of sub-users to use the account without the requirement of creating further individual sub-accounts. The system is also adapted to enable a single user to use the system, without sub-users. FIG. 4 illustrates at 400 such a system. The system 400 includes a domain name recognition server 402 which is in two way communication with a verification server 404. The verification server 404 is in communication with a user account database 406. The domain name recognition server 402 is also in communication with an email to fax conversion server 408.

When the system receives an incoming email 410 from a user it is first directed to the domain name recognition server 402. The domain name recognition server 402 analyses the email address of the incoming message to determine the domain name of the email address. The legitimacy of the incoming email is then verified by determining the Domain Name Server or using other information such as the IP (Internet Protocol) address of the user. This information is then passed to the verification server 406 which performs a comparison with the details held in the user database 406. Upon verification that the domain name is registered for a user, and that the IP address is consistent with that user, the email is passed from the domain name recognition server 402 to the email to fax conversion server 408. The email to fax conversion server 408 then converts the body of the email and its file attachments into a fax, extracts the fax number from the email and then transmits the fax to the intended recipient. The details of the fax are then passed to the user account database to be stored with in the user's account. The details stored include the email address, destination fax number, number of pages, time stamp, etc. These details can then be used at a later date for other purposes, such as billing or carbon sequestration calculation.

In this way a single user, such as a large company, can set up one account with the system and then allow all of its employees to send faxes from their individual computer terminals, provided that they all use the same domain name. Therefore, any email address with the domain name of the company will be allowed to send a fax using the system. In this way the company is provided with a simple solution to managing multiple fax machines, and can decrease both the paper used in order to send faxes in a traditional manner and the time spent in the process. This system also reduces the time required for companies to set up an email to fax system.

Tree Conservation Fax System

The present invention relates to a system for monitoring the conversion of faxes to an electronic format, calculating the benefits of this with regard to the reduction of paper usage, and converting paper use reduction into trees saved and carbon credits gained.

Everyday corporations around the world unnecessarily print tens of thousands of fax related documents, whether it be for sending or receiving, with the majority eventually ending up directly in land fill sites without any recycling. A high percentage of this wastage could be avoided if faxes were maintained in softcopy format without the requirement for hardcopy versions, this in turn would have an added benefit to the environment with a reduction in culled trees (for paper generation) in turn resulting in greater $CO_2$ sequestration.

The present invention is a system that can keep a page count of fax documents that an organisation or individual has received or sent without the requirement to print any paper; it is all maintained in softcopy document (TIFF, PDF, MSdoc etc) formats. With the page count details the system can estimate how many trees have been spared for paper production over any given time period. In turn, the system can also estimate the carbon credits resulting from the tree conservation through the use of the application.

By way of background, climate change is emerging as one of the great challenges for modern society. The basic mechanics of climate change are well understood; the world is warming, much of the warming is due to human emissions of greenhouse gases, and the changes are set to accelerate in the future, bringing many and varied impacts around the world, where e.g. Northern Europe is predicted to become wetter and the Mediterranean drier.

Warming increases evaporation and precipitation, and both aggregate rainfall and occurrences of 'heavy precipitation events' at European latitudes—the principal cause of flooding—has also increased in recent decades. There is also evidence that the frequency and intensity of storms is increasing in certain areas.

Carbon dioxide is the main contributor responsible for 80% of emissions from industrialised countries. The gas is released into the atmosphere primarily from burning fossil fuels: oil, petrol and natural gas. A growing population coupled with increasing demands on transport and energy, has led to emissions increasing at dramatic rates.

It is well researched that trees absorb $CO_2$ by the process of photosynthesis in which solar energy is used to convert water (absorbed through the roots) and $CO_2$ (absorbed by the leaves) into sugars that make up the building blocks of cells and oxygen that is released through the leaves.

As trees grow the carbon is stored in its biomass—about 50% of plant dry matter is carbon. One cubic meter of timber contains about 250 kg of Carbon.

Thus, if a system can prevent the culling of trees for paper generation then the environment may be improved as the spared trees will continue the sequestration of $CO_2$.

The system as shown in FIG. 2 is also enabled to calculate the number of carbon credits accumulated by a user in a given period of time by not generating hard copies of faxes. Carbon credits are used to reduce the amount of carbon dioxide released into the atmosphere. Therefore, in generating carbon credits the system allows for companies to reduce there $CO_2$ emissions.

In summary, the preferred embodiments described above may provide one, some or all of the following features in any appropriate combination:
i) Concept of a fax application platform that can store the number of pages (A4, A3, B4, or letter size) that were associated with documents in softcopy format that required no hardcopy printing to complete a transmission or receipt of a fax document.
ii) System capable of calculating the number of trees preserved by not printing fax documents for sending or receiving. This would be calculated by taken the average sized tree's production of A4 500 page 80 gsm paper reams which is internationally estimated to be 16 reams. The number of pages is divided by 30000 to determine the tree preservation.
iii) System capable of estimating the carbon credits accumulated through tree sequestration by removal of hardcopy printing. This calculation would be based on the average trees $CO_2$ sequestration which is internationally estimated to be worth 0.2 of a carbon credit. Thus 5 trees might for example equate to approximately one carbon credit.
iv) Cumulative page count of sent and received faxes associated with customer accounts.
v) System capable of supporting multiple customers from the same platform and thus reducing the energy requirement for customers to have fax machines switched on and with a further no print cartridge waste benefit.
vi) System capable of sending fax documents via telephony or IP without the requirement to print pages.
vii) System of receiving fax pages with direct conversion to soft copy documents without requirement to print any pages.

It will be understood that the present invention has been described above purely by way of example, and modifications of detail can be made within the scope of the invention.

Each feature disclosed in the description, and (where appropriate) the claims and drawings may be provided independently or in any appropriate combination.

The invention claimed is:

1. A system for determining a measure of the number of pages transmitted by fax to or from a plurality of users, comprising: means for converting the transmitted pages into a format that can be output electronically rather than in hardcopy, means for counting the number of pages within an individual fax transmission, means for associating said fax transmission with a respective one of said plurality of users, means for determining a measure of the total number of pages transmitted by fax to or from each of said plurality of users, and means for allocating said measure, associated with one of said plurality of users, to each of a plurality of groups of said users.

2. A system according to claim 1, further comprising means for determining, as a group measure, a total of the measures allocated to a given group.

3. A system according to claim 2, further comprising means for determining a total of the measures that are not allocated to any group.

4. A system according to claim 2, further comprising means for determining a total of all the measures.

5. A system according to claim 2, further comprising a user interface that is adapted to output a given group measure.

6. A system according to claims 5 wherein said user interface accesses via the internet the given group measure to be output.

7. A system according to claim 1, further comprising a user interface wherein said user interface is adapted to output said measure of the total number of pages transmitted to or from a given user.

8. A system according to claim 1 wherein said means for determining a measure of the total number of pages transmitted by fax to each of said plurality of users is adapted to associate a plurality of fax numbers with a single user.

9. A system according to claim 1, further comprising means for analysing said measure, wherein said analysis is adapted to determine a measure of an equivalent number of trees saved by not producing hardcopies of transmitted pages.

10. A system according to claim 1, further comprising means for analysing said measure, wherein said analysis is adapted to determine a measure of a number of carbon credits gained by not producing hardcopies of transmitted pages.

11. A method of determining a measure of the number of pages transmitted by fax to or from a plurality of users, comprising:
converting the transmitted pages into a format that can be output electronically rather than in hardcopy;
counting the number of pages within an individual fax transmission;
associating said fax transmission with a respective one of said plurality of users;
determining a measure of the total number of pages transmitted by fax to or from each of said plurality of users; and
allocating at least one such measure, associated with one of said plurality of users, to each of a plurality of groups of said users.

12. A method according to claim 11, further comprising allocating a plurality of measures, associated with respective ones of said plurality of users, to said group.

13. A method according to claim 11, further comprising determining, as a group measure, a total of the measures allocated to a given group.

14. A method according to claim 11, further comprising determining a total of the measures that are not allocated to any group.

15. A method according to claim 11 wherein associating said fax transmission with a respective one of said plurality of users is adapted to associate a plurality of fax numbers with a single user.

16. A method according to claim 11, further comprising analysing said measure, wherein said analysis determines a measure of an equivalent number of trees saved by not producing hardcopies of transmitted pages.

17. A method according to claim 11, further comprising analysing said measure, wherein said analysis determines a measure of a number of carbon credits gained by not producing hardcopies of transmitted pages.

18. A system for determining a measure of the number of pages transmitted by fax to or from a plurality of users, comprising:
a processor, and associated memory, containing instructions that when executed by the processor:
convert the transmitted pages into a format that can be output electronically rather than in hardcopy;
count the number of pages within an individual fax transmission;
associate said fax transmission with a respective one of said plurality of users;
determine a measure of the total number of pages transmitted by fax to or from each of said plural of users; and
allocate at least one such measure, associated with one of said plurality of users, to each of a plurality of groups of said users.

* * * * *